US006949683B2

United States Patent
Wieland et al.

(10) Patent No.: US 6,949,683 B2
(45) Date of Patent: Sep. 27, 2005

(54) PROCESS FOR CATALYTIC AUTOTHERMAL STEAM REFORMING OF ALCOHOLS

(75) Inventors: Stefan Wieland, Offenbach (DE); Frank Baumann, Alzenau (DE)

(73) Assignee: Umicore AG & Co. KG, Hanau-Wolfgang (DE); .

( * ) Notice: Subject to any disclaimer, the term of this patent is extended or adjusted under 35 U.S.C. 154(b) by 205 days.

(21) Appl. No.: 10/300,173

(22) Filed: Nov. 20, 2002

(65) Prior Publication Data

US 2003/0116472 A1 Jun. 26, 2003

(30) Foreign Application Priority Data

Nov. 22, 2001 (DE) .......................................... 101 57 155

(51) Int. Cl.$^7$ ........................... C01B 3/32; C07C 27/16
(52) U.S. Cl. ....................... 568/700; 502/304; 423/656
(58) Field of Search .................. 568/700; 502/304; 423/656

(56) References Cited

U.S. PATENT DOCUMENTS

| | | | |
|---|---|---|---|
| 4,367,166 A | 1/1983 | Fujitan et al. | |
| 4,415,484 A | 11/1983 | Setzer et al. | |
| 4,743,576 A | 5/1988 | Schneider et al. | |
| 4,755,498 A | 7/1988 | Setzer et al. | |
| 5,112,527 A | 5/1992 | Kobylinski | |
| 5,883,138 A | 3/1999 | Hershkowitz et al. | |
| 6,267,912 B1 | 7/2001 | Hershkowitz et al. | |
| 6,293,979 B1 | 9/2001 | Choudhary et al. | |
| 6,331,283 B1 | 12/2001 | Roy et al. | |
| 6,342,465 B1 * | 1/2002 | Klein et al. | 502/339 |
| 6,376,423 B2 | 4/2002 | Yagi et al. | |
| 6,436,363 B1 | 8/2002 | Hwang et al. | |
| 6,458,334 B1 | 10/2002 | Tamhanka et al. | |
| 6,524,550 B1 | 2/2003 | Chintawari et al. | |
| 6,749,828 B1 | 6/2004 | Fuknaga | |
| 2002/0007595 A1 | 1/2002 | Maier-Roeltgen et al. | |
| 2002/0009408 A1 | 1/2002 | Wieland et al. | |
| 2002/0150532 A1 | 10/2002 | Grieve et al. | |

FOREIGN PATENT DOCUMENTS

| | | |
|---|---|---|
| CA | 2 348 120 A1 | 11/2001 |
| DE | 197 27 841 | 7/1999 |
| EP | 0 112 613 B1 | 8/1984 |
| EP | 1 157 968 A1 | 11/2001 |
| EP | 1 314 688 A2 | 5/2003 |
| WO | WO 98/55227 | 5/1998 |
| WO | WO 99/48805 | 3/1999 |
| WO | WO 99/64150 | 12/1999 |
| WO | WO 01/52978 A1 | 7/2001 |

OTHER PUBLICATIONS

European Search Report for Application No. EP 02 02 6344, issued Dec. 17, 2003.

* cited by examiner

Primary Examiner—Kamal A. Saeed
(74) Attorney, Agent, or Firm—Kalow & Springutt LLP

(57) ABSTRACT

The invention relates to a process for catalytic autothermal steam reforming of alcohols having two or more carbon atoms by directing a preheated educt or reactant mixture of the alcohols, oxygen and water or steam over a catalyst. The process is conducted in an adiabatic manner wherein the catalyst comprises at least one platinum group metal on an oxidic support selected from the group consisting of aluminum oxide, silicon dioxide, titanium dioxide or mixed oxides thereof and zeolites, and that the educt or reactant mixture contains additional hydrocarbons, which are reformed at the same time as the alcohols.

15 Claims, No Drawings

PROCESS FOR CATALYTIC AUTOTHERMAL STEAM REFORMING OF ALCOHOLS

FIELD OF THE INVENTION

The invention provides a process for hydrogen production. More specifically, a process for catalytic autothermal steam reforming of alcohols, which have two or more carbon atoms, by directing a preheated educt or reactant mixture of alcohols, oxygen and water or steam over a catalyst. This process is conducted in an adiabatic manner. The catalyst in the present invention comprises at least one platinum group metal on an oxidic support selected from the group consisting of aluminum oxide, silicon dioxide, titanium dioxide or mixed oxides thereof and zeolites, and wherein the educt or reactant mixture contains additional hydrocarbons, which are reformed at the same time as the alcohols.

BACKGROUND OF THE INVENTION

The present invention relates to a process for catalytic autothermal steam reforming of alcohols having two or more carbon atoms, in particular ethanol, by directing a preheated educt or reactant mixture of the alcohols, oxygen and water or steam over a catalyst.

For the production of hydrogen, as is known, that alcohols can be converted to hydrogen, carbon monoxide and carbon dioxide in the presence of steam and a suitable catalyst. The reaction is highly endothermic and proceeds for example according to the following reaction equation:

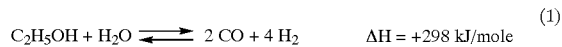

$$C_2H_5OH + H_2O \rightleftharpoons 2\,CO + 4\,H_2 \qquad \Delta H = +298\ \text{kJ/mole} \tag{1}$$

The so-called steam to carbon ratio S/C is characteristic of this reaction. In equation (1), S/C equals 0.5.

Another known method for producing hydrogen is catalytic partial oxidation (CPO). During CPO, especially hydrocarbons are converted to carbon monoxide and hydrogen in the presence of oxygen and a catalyst, for example according to reaction equation (2). In the case of alcohols, the energetic situation is different; for instance, in the case of ethanol, pure partial oxidation is endothermic, i.e. a process that will not proceed without energy input (3a). If the amount of oxygen is increased (3b–3c), a selective catalyst is necessary which preferably oxidizes CO and not hydrogen. An important parameter of partial oxidation is the air coefficient $\lambda$, which is defined as the ratio between the number of moles of oxygen used to the number of moles of oxygen required for complete oxidation (see reaction equation (4)):

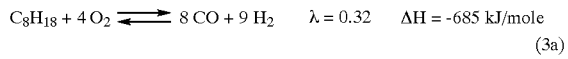

$$C_8H_{18} + 4\,O_2 \rightleftharpoons 8\,CO + 9\,H_2 \qquad \lambda = 0.32 \quad \Delta H = -685\ \text{kJ/mole} \tag{2}$$

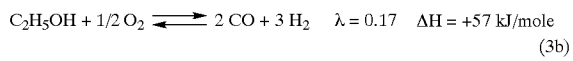

$$C_2H_5OH + 1/2\,O_2 \rightleftharpoons 2\,CO + 3\,H_2 \qquad \lambda = 0.17 \quad \Delta H = +57\ \text{kJ/mole} \tag{3a}$$

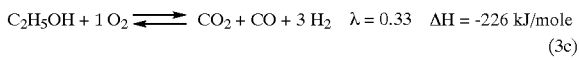

$$C_2H_5OH + 1\,O_2 \rightleftharpoons CO_2 + CO + 3\,H_2 \quad \lambda = 0.33 \quad \Delta H = -226\ \text{kJ/mole} \tag{3b}$$

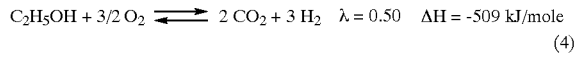

$$C_2H_5OH + 3/2\,O_2 \rightleftharpoons 2\,CO_2 + 3\,H_2 \quad \lambda = 0.50 \quad \Delta H = -509\ \text{kJ/mole} \tag{3c}$$

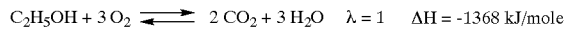

$$C_2H_5OH + 3\,O_2 \rightleftharpoons 2\,CO_2 + 3\,H_2O \quad \lambda = 1 \quad \Delta H = -1368\ \text{kJ/mole} \tag{4}$$

The present invention relates to another method of hydrogen production, the so-called catalytic autothermal steam reforming. This process combines catalytic partial oxidation and steam reforming, wherein the exothermic oxidation supplies the necessary reaction heat for the subsequent endothermic steam reforming. For this purpose, the educt or reactant mixture can be preheated to a preheat temperature. At the temperature prevailing at the reactor outlet, the product mixture is in the thermodynamic equilibrium of the water-gas shift reaction. Autothermal steam reforming combines the advantages of catalytic (partial) oxidation (good start-up behavior) and steam reforming (high hydrogen yields).

A catalyst for use in an autothermal reformer has been disclosed in the art. This catalyst comprises 0.01% to 6% rhodium and 10 to 35% calcium oxide on an alumina support, which is furthermore promoted with 3 to 15% magnesium. The catalyst is used in the form of pellets and in particular has a low tendency to coke at low oxygen/carbon ratios. An example of a typical catalyst system for autothermal reforming comprises an iron oxide catalyst for partial oxidation for about one-third of its length, and the described rhodium catalyst for about two-thirds of its length.

A bifunctional catalyst for the partial oxidation of hydrocarbons has also been disclosed in the art. This catalyst exhibits dehydrogenation activity for dehydrogenating the hydrocarbons and is capable of selectively oxidizing the hydrocarbon chain. The dehydrogenation activity is provided by metals of the eighth group of the periodic table, while selective oxidation is effected by ionized oxygen. The sources for the ionized oxygen are oxides that crystallize in a fluorite or perovskite structure, such as for example zirconium oxide, cerium oxide, bismuth oxide etc. An example of a preferred catalyst is Pt/CeGdO. This is used in the form of pellets with diameters of 1.125 to 1.5 inches.

It in known in that art that a process for the catalytic production of hydrogen by means of a self-sustaining partial oxidation and steam reforming of hydrocarbons, wherein a mixture of the hydrocarbons and an oxygen-containing gas and optionally steam is reacted in the presence of a catalyst comprising rhodium dispersed on a support, which contains cerium and zirconium as cations. The catalyst is used in granular form.

It is also known in the art that a process and an apparatus for autothermal reforming of hydrocarbons wherein the fuel is added to a two-stage reformer via a feeding unit. In a heat exchanger in countercurrent and in a heat-exchanging manner, the resulting reformate is fed to the educt or reactant of the reforming process, which is led from the outside to the inside. The fuel added via the feeding unit, together with the educt or reactant, is directly provided to the reaction zone comprising a catalyst, where the combustion and reforming or catalysis is carried out. The reformer comprises a honeycomb carrier coated with a catalyst in an upper part, and a bed coated with catalyst in a lower part. A honeycomb carrier can also be used instead of the bed.

Catalytic autothermal steam reforming of alcohols seems to be a suitable process for the production of hydrogen in a vehicle powered by fuel cells since by means of this process the hydrogen needed to operate the fuel cells can be obtained from e.g. renewable resources such as bio-ethanol, which in some countries is already used in conventional combustion engines. For this field of application, the hydrogen productivity is of decisive importance. It can either be expressed based on the volume of catalyst, see equation (5), or on the mass of the employed noble metal, see equation (6):

$$P_{Kat} = \frac{V_{H2}}{V_{Kat} \cdot t} \left[ \frac{Nm^3}{1_{Kat} \cdot h} \right] \quad (5)$$

$$P_{EM} = \frac{V_{H2}}{M_{EM} \cdot t} \left[ \frac{Nm^3}{g_{EM} \cdot h} \right] \quad (6)$$

$P_{Kat}$: Hydrogen productivity based on the volume $V_{Kat}$ of the catalyst $P_{EM}$: Hydrogen productivity based on the mass of the noble metal $V_{H2}$: Volume of hydrogen produced under standard conditions t: Time One problem in connection with the use of alcohols for the production of hydrogen by means of autothermal reforming is the fact that for providing the alcohols, the existing infrastructure in place for gasoline and diesel fuel is used, i.e. the biological alcohol is transported in the same truck-trailers and stored in the same tanks as the other engine fuels so that a contamination of the alcohols by gasoline and diesel fuel cannot be prevented. Examinations of the purity of alcohols stored in vessels in which gasoline or diesel fuel had been previously stored have shown that these alcohols may contain between 0.5 and 10 wt.-% of these hydrocarbons, based on the total weight of alcohols and hydrocarbons. Usually, the contamination of the alcohols by hydrocarbons lies between 0.5 and 5 wt.-%.

Based on the forgoing, there is a need in the art for a process for catalytic autothermal steam reforming that allows the simultaneous reforming of alcohols and hydrocarbons with a very high hydrogen productivity, which is well suited for use in mobile systems.

SUMMARY OF THE INVENTION

The present invention provides a process for catalytic autothermal steam reforming that allows the simultaneous reforming of alcohols and hydrocarbons with high hydrogen productivity. This process is appropriate for use in mobile systems.

In one embodiment, the present invention provides a process for catalytic autothermal steam reforming of alcohols having two or more carbon atoms by directing a preheated educt or reactant mixture of the alcohols, oxygen and water or steam over a catalyst. The process is conducted in an adiabatic manner wherein the catalyst comprises at least one platinum group metal on an oxidic support selected from the group consisting of aluminum oxide, silicon dioxide, titanium dioxide or mixed oxides thereof and zeolites, and that the educt or reactant mixture contains additional hydrocarbons, which are reformed at the same time as the alcohols.

For a better understanding of the present invention together with other and further advantages and embodiments, reference is made to the following description taken in conjunction with the examples, the scope of which is set forth in the appended claims.

DETAILED DESCRIPTION OF THE INVENTION

The invention will now be described in connection with preferred embodiments. These embodiments are presented to aid in an understanding of the present invention and are not intended to, and should not be construed to, limit the invention in any way. All alternatives, modifications and equivalents, which may become obvious to those of ordinary skill on reading the disclosure are included within the spirit and scope of the invention.

This disclosure is not a primer on process for preparing platinum or platinum alloy powders, basic concepts known to those skilled in the art have not been set forth in detail.

The process according to the invention is achieved by a single-stage process, i.e. the educt or reactant mixture is directed over a single catalyst capable of providing the energy required for the endothermic steam reforming by catalytic oxidation of part of the educt or reactant mixture in the inlet section of the catalyst. This causes an increase in the temperature of the educt or reactant mixture from the preheat temperature to the necessary reaction temperature between 600 and 800° C. Oxidation and steam reforming then merge into one another.

The catalyst to be used according to the present invention comprises, on a carrier, a catalyst composition, which has been applied in the form of a coating onto the geometric surfaces of the carrier. Preferred carriers are monolithic ceramic or metal honeycomb carriers, open-cell ceramic or metallic foam carriers, metal sheets or irregularly shaped elements. The thickness of the catalytic coating is usually between about 20 and about 100 $\mu$m.

One advantage of this catalyst set-up is its relatively low heat capacity. Furthermore, the entire catalyst composition is very accessible for the reactants since it is spread out in the form of a coating. This results in a high specific catalyst activity and a high dynamic of the catalytic process, which means that the process can easily adapt to the changing demands for hydrogen production in a motor vehicle. It is also important that the process is an adiabatic process. That is, no heat is removed from the catalytic process by means of a heat exchanger. The process according to the present invention therefore has a very short start-up time after cold start of the motor vehicle since no unnecessary components have to be heated to the operating temperature.

The catalyst composition comprises at least one platinum group metal on a fine oxidic support. Thus, the catalyst composition is a catalyst on a support or supported catalyst. The term supported catalyst as it is used in the present invention only refers to the catalyst composition and is distinguished from the catalyst, which consists of the carrier and the supported catalyst applied thereon in the form of a coating.

Possible oxidic supports for the platinum group metals include oxides selected from the group consisting of aluminum oxide, silicon dioxide, titanium oxide or mixed oxides thereof and zeolites. Preferably, materials with a specific surface area of more than 10 m$^2$/g are used in order to allow as highly disperse a distribution of the catalytically active components as possible on this large surface. The techniques for producing such a supported catalyst and for coating an inert carrier therewith are known to the person skilled in the art.

For thermal stabilization and as promoters, the catalyst composition can additionally comprise at least one oxide selected from the group consisting of boric oxide, bismuth oxide, gallium oxide, alkali metal oxides, alkaline earth metal oxides, oxides of subgroup elements and rare earth metal oxides in a concentration of up to about 40 wt.-% based on the total weight of the catalyst composition.

As a noble metal, the catalyst composition preferably comprises about 0.1 to about 2 wt.-% rhodium, based on its total weight. Rhodium exhibits a high steam reforming activity, while at the same time its oxidation activity is low compared to that of platinum. This way, the partial oxidation of the educt or reactant mixture at the inlet of the catalyst is attenuated and high temperature peaks are avoided which might destroy the catalyst. In order to adjust the oxidation activity to the process requirements, the catalyst composition may additionally comprise platinum and/or palladium in a ratio of rhodium to platinum and/or palladium between about 20:1 and about 2:1, preferably about 10:1 to about 3:1. In this connection, it is important that the amount by weight of platinum and/or palladium is lower than that of rhodium in order to avoid overly vigorous oxidation at the catalyst inlet.

Preferably, a catalyst composition is used that comprises rhodium and optionally platinum and/or palladium on an active aluminum oxide. This catalyst composition may additionally comprise cerium oxide to reduce carbon black deposits and increase sulfur resistance.

It has been found that the catalyst to be used in accordance with the present invention is capable of simultaneously reforming a mixture of different alcohols and hydrocarbons. The process may be carried out with linear or branched alcohols or alcohol mixtures. Depending on the alcohol used, steam to carbon ratios S/C of between about 0.5 and about 4 can be applied. The air coefficient $\lambda$ of the educt or reactant mixture and its preheat temperature are selected such that at the outlet of the catalyst a temperature between about 600 and about 800° C. is established.

According to the present invention, these alcohols or alcohol mixtures comprise about 0.5 to about 10 wt.-% of hydrocarbons, based on the total weight of alcohols and hydrocarbons. Preferably, the amount of hydrocarbons lies between about 0.5 and about 5 wt.-%. The hydrocarbons may be diesel fuel or gasoline. In addition to long-chain hydrocarbons, these fuels may also contain aromatic hydrocarbons, which are also simultaneously reformed together with the alcohols and the other hydrocarbons.

Gasoline and particularly diesel fuels usually contain trace amounts of sulfur compounds that can poison the reforming catalysts. However, it has been found that the catalysts suggested for the process of the present invention are relatively resistant to sulfur poisoning. Furthermore, another advantage of the process is that the product gas mixture of the reforming process has a very low methane content of less than 0.5 vol.-%.

The suggested process only represents part of the overall process for the production of hydrogen in a vehicle equipped with fuel cells. In addition to autothermal reforming, this overall process also comprises process steps for the removal of carbon monoxide from the reformate, for example by means of one or more water-gas shift stages. Furthermore, the overall process also involves the catalytic combustion of the anode exhaust gas of the fuel cell. The reaction in the water-gas shift stages and the catalytic combustion are exothermic, and provide the necessary amount of heat for preheating the educt or reactant mixture to a suitable preheat temperature of between about 150 and about 350° C. during the continuous operation of the vehicle.

During cold starting of the vehicle, the catalyst is briefly operated with a educt or reactant mixture not containing any water or steam in order to quickly heat the entire system to the operating temperature by catalytic oxidation at the catalyst. After the operating temperatures have been reached, catalytic autothermal reforming is started by adding steam to the educt or reactant mixture. Alternatively, the operating temperatures can also be adjusted by means of other preheating measures.

Having now generally described the invention, the same may be more readily understood through reference to the following example, which are provided by way of illustration and are not intended to limit the present invention unless specified.

EXAMPLE

The invention is explained in more detail by the following example.

Example 1

A catalyst useful for the process according to the invention was prepared in the following way: Finely divided alumina with a specific surface area (BET-surface) of 100 m$^2$/g and being doped with 5 wt.-% of lanthanum oxide ($La_2O_3$) was dispersed in water. A conventional ceramic honeycomb carrier was dipped into the dispersion to coat the walls of the flow channels with the stabilized alumina. The coated carrier was then dried and calcined at 500° C. The concentration of the alumina coating was 150 g/l of honeycomb carrier. Subsequently the coated carrier was impregnated with an aqueous solution of $RhCl_3$ as a precursor compound for rhodium. The impregnated carrier was then dried, calcined at 500° C. and finally treated in a stream of forming gas (95 vol.-% $N_2$; 5 vol.-% $H_2$) at 400° C. to chemically reduce the rhodium precursor compound. The concentration of rhodium in the finished catalyst was 1 g/l of the honeycomb carrier.

The catalyst was used to autothermally reform ethanol. A mixture of ethanol, air and steam was heated to 500° C. and then conducted through the flow channels of the catalyst. The mass flow of ethanol was 200 g/h. Reforming was done with an air coefficient of $\lambda$=0.22 and varying steam to carbon ratios (S/C). The following table lists the dry composition of the product gas mixture (reformate) at the catalyst outlet.

TABLE

| Composition of reformate at varying S/C ratios | | | | |
|---|---|---|---|---|
| Composition of reformate | S/C = 1.5 | S/C = 2 | S/C = 3 | S/C = 3.5 |
| $H_2$ [vol.-%] | 35.1 | 36.4 | 37.8 | 38.7 |
| $CO_2$ [vol.-%] | 14.0 | 15.4 | 17.0 | 17.6 |
| CO [vol.-%] | 8.7 | 7.2 | 5.1 | 4.4 |
| $CH_4$ [vol.-%] | 0.23 | 0.22 | 0.22 | 0.21 |
| Catalyst outlet temperature [° C.] | 649 | 644 | 637 | 631 |

The results show that according to the present process high hydrogen output can be obtained at relatively low catalyst outlet temperatures.

While the invention has been described in connection with specific embodiments thereof, it will be understood that it is capable of further modifications and this application in intended to cover any variation, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed:

1. A process for catalytic autothermal steam reforming of alcohols having two or more carbon atoms comprising directing a preheated reactant mixture of the alcohols, oxygen and water or steam over a catalyst, in which the process is conducted in an adiabatic manner, wherein the catalyst comprises at least one platinum group metal on an oxidic support selected from the group consisting of aluminum oxide, silicon dioxide, titanium dioxide or mixed oxides thereof and zeolites, and wherein the reactant mixture contains additional hydrocarbons, which are reformed at the same time as the alcohols.

2. The process according to claim 1, wherein the preheated reactant mixture comprises about 0.5 to about 10 wt. % hydrocarbons, based on the total weight of alcohols and hydrocarbons.

3. The process according to claim 2, wherein the hydrocarbons are diesel fuels.

4. The process according to claim 2, wherein the hydrocarbons are gasoline.

5. The process according to claim 2, wherein the hydrocarbons also comprise aromatic hydrocarbons in addition to long-chain hydrocarbons.

6. The process according to claim 1, wherein the alcohols mostly or completely consist of ethanol.

7. The process according to claim 1, wherein the catalyst additionally comprises at least one oxide selected from the group consisting of boric oxide, bismuth oxide, gallium oxide, alkali metal oxides, alkaline earth metal oxides, oxides of subgroup elements and rare earth metal oxides in a concentration of up to about 40 wt. % based on the total weight of the catalyst composition.

8. The process according to claim 1, wherein the catalyst comprises rhodium in a concentration of about 0.1 to about 2 wt.-%, based on total weight of the catalyst composition.

9. The process according to claim 8, wherein the catalyst additionally comprises platinum and/or palladium in a ratio of rhodium to platinum and/or palladium of between about 20:1 to about 2:1.

10. The process according to claim 8, wherein the aluminum oxide is used as support for rhodium and optionally platinum/palladium.

11. The process according to claim 10, wherein the catalyst additionally comprises cerium oxide.

12. The process according to claim 11, wherein the catalyst is coated on a carrier.

13. The process according to claim 12, wherein the carrier is a monolithic honeycomb ceramic or metal carriers, open-cell ceramic or metallic foam bodies, metal sheets or irregularly shaped elements.

14. The process according to claim 1, wherein the preheated reactant mixture is selected such that at the outlet of the catalyst the temperature is between about 600 and about 800° C.

15. The process according to claim 13, wherein the reactant mixture has a steam to carbon ratio that is adjusted to between about 0.5 and about 4.

* * * * *